Patented Aug. 27, 1940

2,212,608

UNITED STATES PATENT OFFICE 2,212,608

PROCESS OF DYEING PELTS, HAIRS, OR FEATHERS

Erich Lehmann, Priorau, Kreis Bitterfeld, Germany, assignor to General Aniline & Film Corporation, a corporation of Delaware No Drawing. Application February 11, 1939, Serial No. 255,867. In Germany February 18, 1938

8 Claims. (Cl. 8—11)

The present invention relates to a new process for dyeing pelts, hairs, and feathers and, more particularly, it relates to a process in which a new class of pelt-dyes is used.

In processes of dyeing pelts, hairs and feathers there have been suggested instead of the diamines, aminohydroxy compounds and the like already known for a longer time for the said purpose, the salt-like molecular compounds of aromatic and heterocyclic amines and polyhydroxy compounds or suitable substitution products thereof. These compounds are converted into dyes by an oxidation process effected on the hair suitably pretreated for this purpose. Dyeing is effected at a temperature not exceeding 35° C., in order to avoid any damage to the hair and skin sensitive to higher temperatures.

Proposals made to replace these so-called oxidation dyes by acid or basic dyes of the azo- or tri-phenylmethane series have hitherto proved successful only in the dyeing of pelts to be worked to rugs. As to the dyeing of pelts serving for clothing purposes, the use of such dyes has been of no success. In order to obtain dyeings of rather good properties of fastness by using azo dyes high temperatures are necessary, at which the skin pretreated in the usual manner is, however, so much damaged that an extensive aftertreatment is indispensable. At the dye-bath temperature suitable for oxidation dyes azo dyes sparingly dye the hair of the pelt light tints of bad properties of fastness. Moreover, the tints obtained from azo dyes are out of the sphere of genuine pelt colors and therefore they concern fancy articles only.

It has now been found that tints of all varieties and good properties of fastness may be obtained on pelts and the like by use of certain azo dyes if the latter are combined by a hydroxy group in a saltlike manner with a compound of the aromatic or heterocyclic series known from the series of pelt dyes and containing one or several amino groups. The azo dyes thus obtained correspond to the general formula

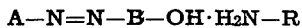

A—N=N—B—OH·H₂N—R wherein A means a radical of the benzene series, B is a radical of the benzene or naphthalene series and R likewise is a radicle of the benzene series.

As amines yielding the member A of the formula above, I mention, for instance, aniline, para-anisidine, acet-meta-phenylenediamine, acet-para-phenylenediamine, 4-aminodiphenylamine, 4-amino-4'-methoxydiphenylamine, 4-aminodiphenylamine-2'-sulfonic acid, anthranilic acid, 4-chloro-2-amino-1-hydroxybenzene a. s. o.

The member B—OH of the said formula may be derived from 1.2-, 1.3-, 1.4-dihydroxybenzene, 1.2-, 1.3-, 1.5-, 1.6-, 1.7-, 1.8-, 2.6-, or 2.7-dihydroxynaphthalene, 4-chloro-1-hydroxynaphthalene, 2.4-dichloro-1-hydroxynaphthalene, 1.6-dihydroxy-5-nitronaphthalene, 1-amino-5-hydroxynaphthalene, 1.5-dihydroxy-2-amino-naphthalene, 2-amino-7-hydroxynaphthalene, 1-amino-8-hydroxynaphthalene, 1-amino-5-hydroxy-8-chloronaphthalene.

The H₂N.R member of this formula may be 1.3- or 1.4-diaminobenzene as well as the alkyl-, alkoxy-, chloro- and nitro-substitution products thereof, N-mono or dialkyl- or aralkyl substituted derivatives of the 1.3 and 1.4-diaminobenzene, and their derivatives substituted in the nucleus, if desired, by chlorine, nitro, alkyl, alkoxy and so on; then aminodiphenyl-amine which likewise may be substituted by alkyl-, cycloalkyl, aralkyl-, hydroxyalkyl-, or alkoxy groups, or the corresponding compounds of the 4.4'-diaminodiphenylamine. From the heterocyclic series I enumerate 8-aminoquinoline, 8-aminoquinaldine, 5.8-diaminoquinoline, and 3-aminocarbazole.

These new dyes, the going on of which is effected by oxidizing agents are obtained by converting a monoazo dye, produced in the usual manner and still containing one or several hydroxy groups, with an amino compound of the aromatic or heterocyclic series so as to obtain a salt-like molecular compound. This reaction may be effected either in solution, in suspension or in melt. In order to bring about this conversion while preparing the bath, it will suffice to mix the compounds intensively, suitably in equi-molecular proportions, if they readily dissolve in water. Water-insoluble molecular compounds of azo dyes and amines have to be dispersed in the dye-bath by use of dispersing agents.

The new dyes may be applied for dyeing in the same manner as oxidation dyes. They are characterized by a strong coloring power and yield tints of good properties of fastness. They may also be used when mixed with known oxidation dyes.

The following examples illustrate the invention, the parts being by weight:

*Example 1.*—37 parts of an azo dye, obtained by coupling diazotized 4.6-dinitro-2-aminophenol with 1.5-dihydroxynaphthalene, and 11 parts of 1.4-diaminobenzene are together dissolved in 500 parts of methanol by boiling. When distilling off the methanol there is obtained a dark red powder, insoluble in water.

2 parts of this dye are triturated with 3 parts of a dispersion agent, made as described in British specification No. 271,474 from solar oil (brown coal-tar oil) and xylene in the presence of fuming sulfuric acid, and suspended in 1000 parts of water. The solution is mixed with 2 parts of a hydrogen peroxide solution of 30 per cent strength. A lambskin mordanted with chromium salts is dyed a dark brown.

*Example 2.*—35 parts of an azo dye obtained by coupling diazotized 4-aminodiphenylamine with 1.5-dihydroxynaphthalene are triturated together with 18 parts of 4-aminodiphenylamine and 100 parts of a dispersion agent made by treating castor oil with 1-naphthyl-5-sulfonic acid in presence of sulfuric acid as described in British specification No. 346,425.

10 parts of this dye dissolved in 1000 parts of water yield, in the presence of 6 parts of a hydrogen peroxide solution of 30 per cent. strength, on an Indian lambskin a dull bluish black tint of very good fastness to light.

*Example 3.*—29.5 parts of an azo dye obtained by coupling diazotized 4-aminoanisol with 1.7-dihydroxynaphthalene are dissolved in 500 parts of alcohol together with 21.4 parts of 4-amino-4'-methoxydiphenylamine. After the distilling of the alcohol there is obtained a violet brown powder, insoluble in water.

3.5 parts of this dye are dispersed in 1000 parts of water, in the presence of 6.5 parts of a dispersion agent, made as described in British specification No. 240,318 by condensation of a naphthalene sulfonic acid with benzylchloride. A white lambskin pretreated with chromium copper salts is dyed a dull black.

*Example 4.*—1.1 parts of an azo dye obtained by coupling diazotized 4-aminophenol with 1.3-dihydroxybenzene is dissolved in 1000 parts of water and 0.6 part of 1.4-diaminobenzene are added to this solution. A white Indian lambskin pretreated with chromium salts is dyed a dull grey brown.

In a completely analogous manner there may be used as dyeing agent the salt-like compound produced from the azo dye obtained by coupling diazotized paraanisidine with 2.7-dihydroxynaphthalene and from paraaminodiphenylamine; it dyes lambskin mordanted with a chromium or iron mordant violet black tints.

On the other hand, the azo dye made by coupling diazotized acet-meta-phenylenediamine with resorcin forms a salt-like compound with metatoluylenediamine, which dyes a skin mordanted with an iron mordant yellow tints which become brownish-yellow if a chromium mordant is deposited on the skin.

Finally, the dye obtained by coupling diazotized acet-meta-phenylenediamine with 1.5-dihydroxynaphthalene yields a salt-like compound with para-aminodiphenylamine, which dyes lambskin mordanted with an iron mordant grey tints.

It is obvious that my invention is not limited to the foregoing examples or to the specific details given therein. As may be seen from the general formula given thereof, a great number of new and valuable dyes for dyeing pelts, skins and feathers according to the oxidation process become available by the present invention, and the claims following hereafter are intended to cover all these possibilities.

What I claim is:

1. The process of dyeing pelts, hairs, feathers and materials manufactured from these products which comprises treating the said materials mordanted with a mordant of the group consisting of chromium, iron and copper mordants in a bath containing an oxidizing agent and a salt-like compound of the general formula $$A-N=N-B-OH \cdot H_2N-R$$

wherein A is a radicle of the benzene series, B is an aromatic radicle of the group consisting of benzene and naphthalene radicles, and R is an amino compound of the group consisting of aminobenzenes, aminodiphenylamines and heterocyclic amines.

2. The process of dyeing pelts, hairs, feathers and materials manufactured from these products which comprises treating the said materials mordanted with a mordant of the group consisting of chromium, iron and copper mordants in a bath containing an oxidizing agent and a salt-like compound of the general formula

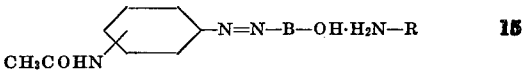

wherein B is an aromatic radicle of the group consisting of benzene and naphthalene radicles and R is an amino compound of the group consisting of aminobenzenes, aminodiphenylamines and heterocyclic amines.

3. The process of dyeing pelts, hairs, feathers and materials manufactured from these products which comprises treating the said materials mordanted with a mordant of the group consisting of chromium, iron and copper mordants in a bath containing an oxidizing agent and a salt-like compound of the general formula

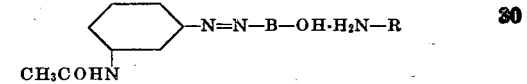

wherein B is an aromatic radicle of the group consisting of benzene and naphthalene radicles and R is an amino compound of the group consisting of aminobenzenes, aminodiphenylamines and heterocyclic amines.

4. The process of dyeing pelts, hairs, feathers and materials manufactured from these products which comprises treating the said materials mordanted with a mordant of the group consisting of chromium, iron and copper mordants in a bath containing an oxidizing agent and a salt-like compound of the general formula

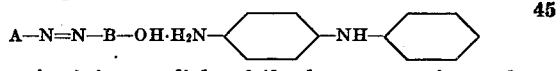

wherein A is a radicle of the benzene series and B is an aromatic radicle of the group consisting of benzene and naphthalene radicles.

5. The process of dyeing pelts, hairs, feathers and materials manufactured from these products which comprises treating the said materials mordanted with a mordant of the group consisting of chromium, iron, and copper mordants in a bath containing an oxidizing agent and a salt-like compound of the general formula

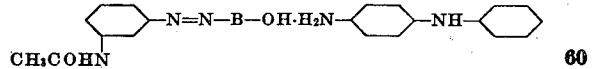

wherein B is an aromatic radicle of the group consisting of benzene and naphthalene radicles.

6. The process of dyeing pelts, hairs, feathers and materials manufactured from these products which comprises treating the said materials mordanted with a mordant of the group consisting of chromium, iron and copper mordants in a bath containing an oxidizing agent and a salt-like compound of the formula

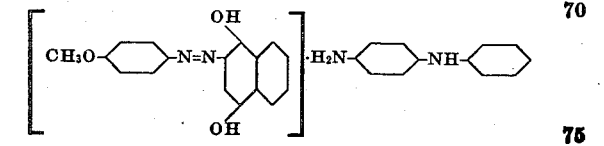

7. The process of dyeing pelts, hairs, feathers and materials manufactured from these products which comprises treating the said materials mordanted with a mordant of the group consisting of chromium, iron and copper mordants in a bath containing an oxidizing agent and a salt-like compound of the formula

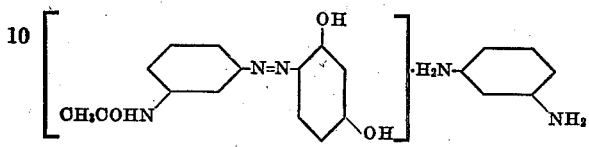

8. The process of dyeing pelts, hairs, feathers and materials manufactured from these products which comprises treating the said materials mordanted with a mordant of the group consisting of chromium, iron and copper mordants in a bath containing an oxidizing agent and a salt-like compound of the formula

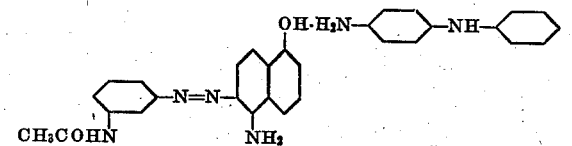

ERICH LEHMANN.